United States Patent [19]

Folser

[11] 4,193,860
[45] Mar. 18, 1980

[54] LIQUID-PERMEABLE ELECTRODE

[75] Inventor: George R. Folser, Lower Burrell, Pa.

[73] Assignee: The United States of America as represented by the United States Department of Energy, Washington, D.C.

[21] Appl. No.: 938,141

[22] Filed: Aug. 30, 1978

[51] Int. Cl.² .................... C25B 1/02; C25B 11/12; C04B 35/52
[52] U.S. Cl. .................... 204/284; 204/294; 264/29.5; 264/105
[58] Field of Search .............. 204/284, 294; 264/105, 264/29.1, 29.5

[56] References Cited

U.S. PATENT DOCUMENTS

| | | | |
|---|---|---|---|
| 934,988 | 9/1909 | Adolph | 204/294 |
| 1,299,846 | 4/1919 | McCoy | 204/294 |
| 1,988,478 | 1/1935 | Broadwell | 204/294 |
| 3,320,150 | 5/1967 | Metrailer | 204/294 |
| 3,389,200 | 6/1968 | Olstowski | 204/294 |
| 3,507,773 | 4/1970 | Grangaard | 204/294 |
| 3,838,188 | 9/1974 | Farrell | 264/105 |
| 3,856,574 | 12/1974 | Amagi | 264/105 |
| 3,907,950 | 9/1975 | Bickerdike | 264/29.5 |

Primary Examiner—T. M. Tufariello
Attorney, Agent, or Firm—R. V. Lupo; Frank H. Jackson; James W. Weinberger

[57] ABSTRACT

Electrodes for use in an electrolytic cell, which are liquid-permeable and have low electrical resistance and high internal surface area are provided of a rigid, porous, carbonaceous matrix having activated carbon uniformly embedded throughout. The activated carbon may be catalyzed with platinum for improved electron transfer between electrode and electrolyte. Activated carbon is mixed with a powdered thermosetting phenolic resin and compacted to the desired shape in a heated mold to melt the resin and form the green electrode. The compact is then heated to a pyrolyzing temperature to carbonize and volatilize the resin, forming a rigid, porous structure. The permeable structure and high internal surface area are useful in electrolytic cells where it is necessary to continuously remove the products of the electrochemical reaction.

5 Claims, 1 Drawing Figure

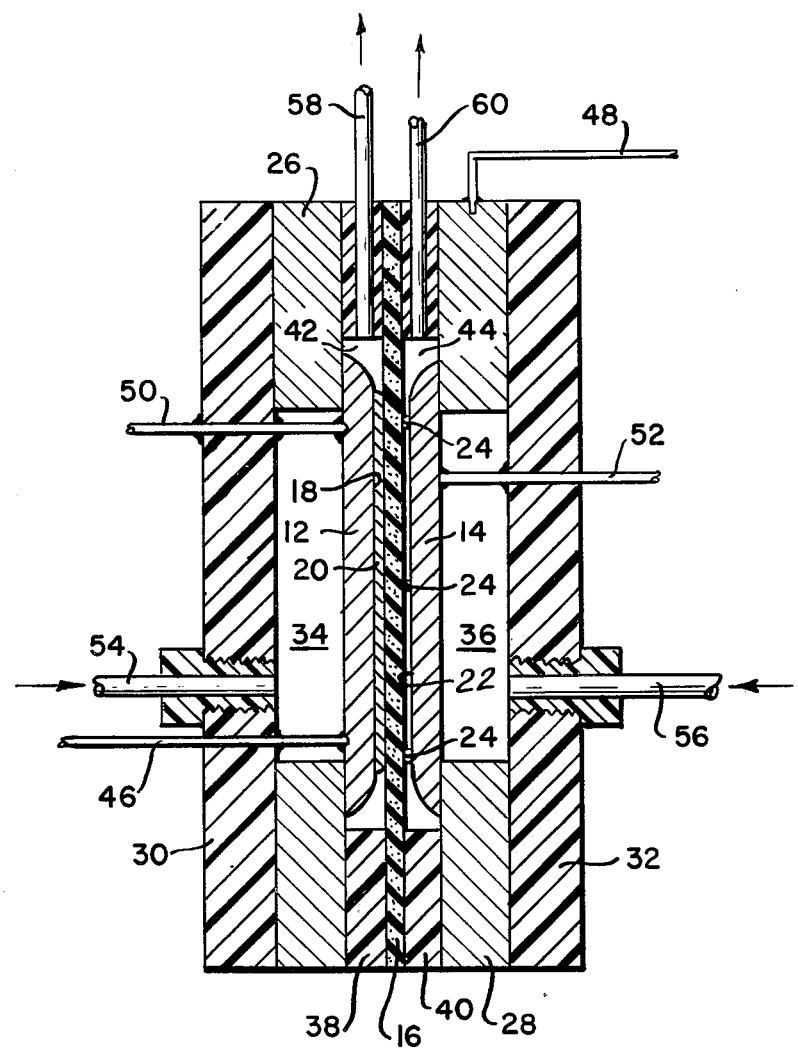

LIQUID-PERMEABLE ELECTRODE

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to electrodes for use in electrolytic cells and to a method for preparing the electrodes. More specifically, this invention relates to fluid-permeable electrodes suitable for use as anodes and cathodes in electrolytic hydrogen generation cells in which it is necessary to continuously remove the products of the electrochemical reaction and to a method for preparing the electrodes.

An assured long-term supply of inexpensive energy is essential for the maintenance and growth of a modern industrial society. The growing demand for energy, combined with the realization that fossil fuel sources are limited, has made it critical to examine alternate sources of energy and to develop methods for extending the lifetimes of our remaining fuels.

As the supply of natural gas and oil decreases, increased emphasis is being placed on methods of obtaining liquid and gaseous fuels from coal. Nearly all coal conversion methods involve increasing the hydrogen-to-carbon ratio of the hydrocarbons in the product. This is accomplished by either adding hydrogen to or removing carbon from the coal. The lighter the final hydrocarbon, the more the hydrogen-to-carbon ratio must be increased.

When external hydrogen is supplied to a coal conversion process, quantitatively less carbon is rejected in the process of adjusting the hydrogen-to-carbon ratio. However, depending upon the process, hydrogen production itself can consume large quantities of hydrocarbons. Thus, sources of hydrogen other than from fossil fuels are necessary to efficiently utilize our alternate reserves of fossil fuels. The production of hydrogen from water becomes important, particularly if the process can be energized by nuclear heat, solar energy or high-temperature waste heat from other industrial processes.

The theoretical voltage required to decompose water is 1.23 V, although many commercial electrolytic processes require over 2.0 V to accomplish this. Thus many processes for splitting water are presently under development which will require only an input of thermal energy or thermal energy coupled with a small quantity of electrical power in order to keep costs and energy consumption at a low level. One example of the latter is a two-step hybrid electrochemical/thermochemical process cycle called the sulfur cycle water decomposition system. This process in its most general form consists of two chemical reactions—one for producing oxygen and the other for producing hydrogen. The production of oxygen occurs via the thermal reduction of sulfur trioxide obtained from sulfuric acid.

$$H_2SO_4 \rightarrow H_2O + SO_3 \rightarrow H_2O + SO_2 + \tfrac{1}{2} O_2$$

The process is completed by using the sulfur dioxide from the thermal reduction step to depolarize the anode of a water electrolyzer. The overall reduction occurring electrochemically is $$2H_2O \rightarrow H_2 + H_2O$$

This is comprised of the reactions:

Cathode $2H^+ + 2e^- \rightarrow H_2$

Anode $H_2SO_3 + H_2O \rightarrow 2H^+ + H_2SO_4 + 2e^-$

The net result is the decomposition of water into hydrogen and oxygen while sulfur oxides are involved as recycling intermediates. Although electrical power is required in the electrolyzer, the quantities are much smaller than those necessary in conventional electrolysis, only 0.17 volts being needed at unit activity for reactants and products, which is less than 15% of those required in conventional electrolysis.

However, early tests showed that the current could not be maintained for any period of time and that at the cell anode where sulfurous acid is oxidized to sulfuric acid the anode potential quickly went to oxygen evolution potential. This was found to be due to the low solubility of $SO_2$ and the fact that the sulfurous acid can only reach the anode by diffusion and that once the material is oxidized there is no tendency to leave the vicinity of the anode surface. A number of solutions have been tried to increase contact between the $SO_2$ and the anode. For example, porous and hollow electrodes have been tried, as has circulating the anolyte around flooded platinized carbon or platinized platinum electrodes, but cell voltages continued to be too high.

SUMMARY OF THE INVENTION

An electrode has been prepared for use in electrochemical cells which has eliminated many of the hereinbefore mentioned problems. The electrode is a liquid-permeable structure having low electrical resistance and a high internal surface area so that a flow of electrolyte through the electrode will continuously remove the oxidized material from the electrode surface. The electrode consists of a rigid, porous, liquid-permeable carbonaceous matrix which has high surface area activated carbon uniformly embedded in the matrix. The electrode may contain evenly distributed particulate platinum as an electro-catalyst to further improve electron transfer betweena the electrode and the electrolyte.

The electrode is prepared by mixing about 10 parts by weight of activated charcoal with from 6 to 10 parts by weight of a powdered thermosetting phenolic resin to form a mixture, compacting the mixture in a heated mold of the desired shape to melt the resin and form a green electrode and heating the green electrode to from about 550° to 750° C. in a nonoxidizing atmosphere for a period of time sufficient to pyrolyze the resin and volatilize from about 40 to 60 weight percent of the resin present in the green compact to form a porous, rigid, liquid-permeable structure.

The porosity of the electrode can be increased further by adding to the mixture a volatile solid such as oxalic acid equal to about 3 to 5 weight percent of the activated carbon. This volatile will vaporize at pyrolyzation temperature to impart additional porosity into the carbonaceous matrix.

In its preferred form, the electrode contains a plurality of parallel evenly spaced ribs on one face to ease the flow of electrolyte from the electrode.

The electrode of the invention is suitable for application as a cathode as well as an anode, since the flow-through feature will permit some hydrogen evolution from all surfaces of the electrode and a constantly renewed acid flow will help sweep away the hydrogen bubbles as they are formed.

It is therefore the object of the invention to provide an improved electrode which is liquid-permeable and has a high internal surface area for use in electrochemical cells where it is necessary to continuously remove the products of the electrochemical reaction from the surface of the electrode.

BRIEF DESCRIPTION OF THE DRAWING

The FIGURE is a cross-sectional schematic view of an electrochemical cell used in testing the electrode.

DETAILED DESCRIPTION OF THE PREFERRED EMBODIMENT

In the FIGURE, an electrolytic cell 10 is shown which includes a liquid-permeable cathode 12 and anode 14 separated by a porous rubber membrane 16. Inner face 18 of cathode 12 contains a plurality of parallel evenly spaced vertical ribs 20 while inner face 22 of anode 14 contains a plurality of parallel evenly spaced horizontal ribs 24 which together support membrane 16 and permit the electrolyte to flow from the electrodes. The opposite faces of electrodes 12 and 14 are attached by conductive epoxy resin to one side of electrically conductive open centered frames 26 and 28 respectively. Opposite the electrodes, each frame is covered by nonconductive plates 30 and 32 which form catholyte 34 and anolyte 36 receiving chambers within the frames, for supplying electrolyte to the electrodes. On either side of membrane 16 are nonconductive frame-shaped spacers 38 and 40 to seal membrane 16 to conductive frames 26 and 28 respectively and form outlet chambers for catholyte 42 and anolyte 44 as it passes from the electrodes. Electrical conductors 46 attached to cathode 12 and 48 attached to frame 28 supply current to the electrodes from a source (not shown), while electrical contacts 50 and 52 on the electrodes permit the monitoring of cell voltage. Fresh electrolyte is supplied to chambers 34 and 36 through inlets 54 and 56 in covers 30 and 32. Catholyte and hydrogen are removed from outlet chamber 42 through outlet 58 in spacer 38 while anolyte and sulfuric acid are removed through outlet 60 in spacer 40.

In operation of the cell, $H_2SO_4$ as the catholyte is pumped through inlet 54 into chamber 34 where it flows through cathode 12, where some of it is transformed into hydrogen, into outlet chamber 42 and out through outlet 58. The anolyte which may be either sulfuric acid or water saturated with $SO_2$ enters chamber 36 through inlet 56 where it flows through anode 14 where sulfuric acid is formed and into chamber 44 and out through outlet 60. The catholyte is maintained at a pressure slightly greater than the anolyte to prevent any passage of $SO_2$ through the membrane into the catholyte where it would be reduced to sulfur and reduce the efficiency of the cathode.

In order to provide an electrode having a high internal surface area and low electrical resistance for improved electron transfer between electrode and electrolyte, activated charcoal which has a high surface area is used. The resin may be any thermosetting phenolic resin which is a powder at room temperature such as phenol formaldehyde or phenol furfuryl. The activated charcoal and resin are blended into a mixture in a ratio of about 10 parts by weight activated charcoal to from 6 to 10 parts by weight, preferably 8 parts, of resin in order to achieve a final electrode having sufficient permeability and strength to withstand the passage of electrolyte therethrough.

The powdered mixture is placed in a mold of the apropriate shape heated to 95°–150° C. and compacted at 400 to 2000 lbs psi to melt the resin and form the green electrode. The temperature need only be high enough to melt the resin and will depend upon the resin being used. Pressures higher than 2000 lbs are undesirable because they may reduce the internal surface area of the final electrode. Various shapes including disks or plates with various cross sections are contemplated depending upon the particular application. For use with the electrolytic cell described, cross sections may range from about $\frac{1}{8}$ to $\frac{1}{4}''$ in order to provide adequate permeability. Electrically conductive mesh or screens can be molded into the shapes as necessary to provide additional strength.

The green electrodes are heated under a nonoxidizing or inert atmosphere such as nitrogen or hydrogen, preferably flowing, to a temperature of from 550° to 750° C., preferably from about 600° to 650° C., in order to pyrolyze the resin to carbon and for a period of time sufficient to volatilize from about 40 to 60 weight percent of the resin in the green compact, to form a liquid-permeable electrode containing from about 40 to 65 volume percent porosity.

Electrodes containing platinum must be cooled either in an inert atmosphere or quickly with dry ice to prevent combustion due to the highly active structure.

It may be necessary to provide the electrode with an electrocatalyst such as platinum in order to further improve electron transfer between electrode and electrolyte. Preferably, platinized activated charcoal containing from about 0.5 to 10 weight percent platinum may be substituted for uncatalyzed activated charcoal by increasing the amount of charcoal in the mixture to offset the weight of platinum. Alternatively, the finished porous electrode may be electroplated or it may be contacted with a solution of hexachloroplatinic acid and heated to decompose the compound.

The electrodes must be sufficiently permeable to permit a continuous flow of electrolyte through the electrode, provide adequate internal surface area for good electron transfer between electrolyte and electrode and have sufficient structural strength to withstand the flow of electrolyte through the electrode under pressure. The porosity may be from about 40 to 65 volume percent with a preferred range of 40 to 50 volume percent. Pore size may vary from about 36 to 360 microns while permeability should be no less than about 0.110 ml/min/cm$^2$/cm water pressure and may be greater consistent with adequate electron transfer between electrolyte and electrode for adequate cell efficiency.

EXAMPLE I

A number of electrodes were prepared by mixing 11 parts by weight of activated carbon containing 10 weight percent platinum with 8 parts by weight of pheno-formaldehyde (Bordon Chemical Co. ADT 12–163) until well mixed. The mixture was then placed into a 2″×2″ stainless steel die heated to a temperature of about 100° C. and pressed at 400 lbs psi to form a green compact about $\frac{1}{8}''$ thick containing a plurality of parallel 1/16″ thick ribs on one surface.

The green compacts were placed in a hydrogen belt furnace and heated to 650° C. for about 10 minutes to pyrolyze most of the resin to carbon and to volatilize about 45 weight percent of the resin.

The electrodes were placed into an electrolytic cell as described previously. The anolyte and catholyte were both 50% sulfuric acid while the anolyte was also saturated with $SO_2$. ($H_2SO_4$ saturated with $SO_2$ is used in place of sulfurous acid for convenience.) At a current density of 200 mA/cm² and a cell temperature of 50° C., the cell operated for 200 hours with a nominal cell voltage of 600 mV (initially at 700 mV and reaching a low of about 560 mV), which was many hours longer than the cell had operated before.

EXAMPLE II

Additional electrodes were prepared by mixing 11 parts by weight of activated carbon containing 10 weight percent platinum (Engelhard), 8 parts by weight powdered phenol formaldehyde resin and oxalic acid equal to 3 weight percent of the activated charcoal in a ball mill for approximately one hour. The material was then placed into a mold preheated to 100° C. and pressed at 500 lbs psi for 10 minutes. After pressing, the electrodes were placed into a belt furnace, purged with nitrogen and heated under a flowing hydrogen atmosphere to 650° C. and held at temperature for 10 minutes to achieve a resin weight loss of 45%, and cooled to ambient temperature.

One electrode, designated EC 1, was found to have a maximum pore diameter of 363 microns and a permeability of 0.116 ml/min/cm²/cm water pressure, while electrode EC 2 had a pore size of 216 microns.

The electrodes were placed into an electrolytic cell and tested under the conditions previously described. At a current density of 200 mA/cm² EC 1 had an anode potential of 800 mV in one test and 820 mV in a second test. Under the same conditions EC 2 had an anode potential of 860 mV and 844 mV.

It can be seen from the above examples and description that the present invention provides an improved electrode structure for use in electrolytic cells which provides a high internal surface area of activated charcoal and which is permeable to electrolyte, which makes it particularly useful in electrolytic cells where it is necessary to continuously remove the products of the electrochemical reaction from the surface of the electrode.

The embodiments of the invention in which an exclusive property or privilege is claimed are defined as follows:

1. Method of preparing a rigid, porous, liquid-permeable low-electrical-resistance electrode for use in an electrolytic cell comprising:
    mixing about 10 parts by weight of activated charcoal, from 6 to 10 parts by weight of a powdered thermosetting resin selected from the group consisting of phenol formaldehyde and phenol furfuryl and 3 to 5 weight percent, relative to the activated charcoal, oxalic acid to form a mixture;
    compacting the mixture in a heated mold to melt the resin, forming a green electrode; and
    heating the green electrode to from 550° to 750° C. in a nonoxidizing atmosphere for a period of time sufficient to pyrolyze the resin, volatilize the oxalic acid and volatilize from about 40 to 60 percent of the resin in the green electrode, thereby forming a rigid, porous, liquid-permeable electrode having a low electrical resistance.

2. The method of claim 1 wherein the activated carbon has been catalyzed with from 0.5 to 10 weight percent of platinum and the mixture contains additional activated charcoal to offset the weight of the platinum.

3. The method of claim 2 wherein the activated carbon has been catalyzed with from 0.5 to 10 weight percent of platinum and the mixture contains additional activated charcoal to offset the weight of the platinum.

4. A liquid-permeable electrode for use in electrolytic cells, said electrode comprising a rigid, porous carbonaceous matrix containing 70 to 85 weight percent activated carbon uniformly embedded in the matrix and exposed to interstitial volume within said porous matrix, said electrode containing from about 40 to 65 volume percent porosity and having a permeability of at least 0.11 ml/min/cm²/cm water pressure.

5. The electrode of claim 4 wherein the activated carbon is catalyzed with from 0.5 to 10 weight percent platinum.

* * * * *